United States Patent
Yoshimura et al.

(10) Patent No.: US 7,162,725 B2
(45) Date of Patent: Jan. 9, 2007

(54) DISC CENTERING DEVICE

(75) Inventors: Toshio Yoshimura, Kanagawa-ken (JP); Akeshi Shitamichi, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 0 days.

(21) Appl. No.: 11/410,124

(22) Filed: Apr. 25, 2006

(65) Prior Publication Data

US 2006/0242658 A1    Oct. 26, 2006

(30) Foreign Application Priority Data

Apr. 25, 2005    (JP)    ............................. 2005-126960

(51) Int. Cl.
*G11B 17/04*    (2006.01)
(52) U.S. Cl. ..................................... 720/620
(58) Field of Classification Search ................. 720/620
See application file for complete search history.

(56) References Cited

FOREIGN PATENT DOCUMENTS

| | | |
|---|---|---|
| JP | 06-195839 | 7/1994 |
| JP | 11-213504 | 8/1999 |
| JP | 2000-113546 | 4/2000 |
| JP | 2001-176161 | 6/2001 |
| JP | 2001-344861 | 12/2001 |
| JP | 2003-173601 | 6/2003 |
| JP | 2003-196906 | 7/2003 |
| JP | 2003-257109 | 9/2003 |
| JP | 2005-063671 | 3/2005 |

*Primary Examiner*—Hoa T. Nguyen
*Assistant Examiner*—Mark Blouin
(74) *Attorney, Agent, or Firm*—Bacon & Thomas

(57) ABSTRACT

The invention seeks to provide a disc centering device of simple arrangement in a disc player for laying large and small size discs. One of paired, i.e., left and right, leading members and a trigger member also serve as a pair of small size disc stoppers, and the other leading member is provided with the sole function of correcting the deviation of the small size discs. Thus, the problem of the difficulty of positioning by providing the paired leading members with stopper function, is solved with a simple arrangement.

7 Claims, 8 Drawing Sheets

F I G. 3
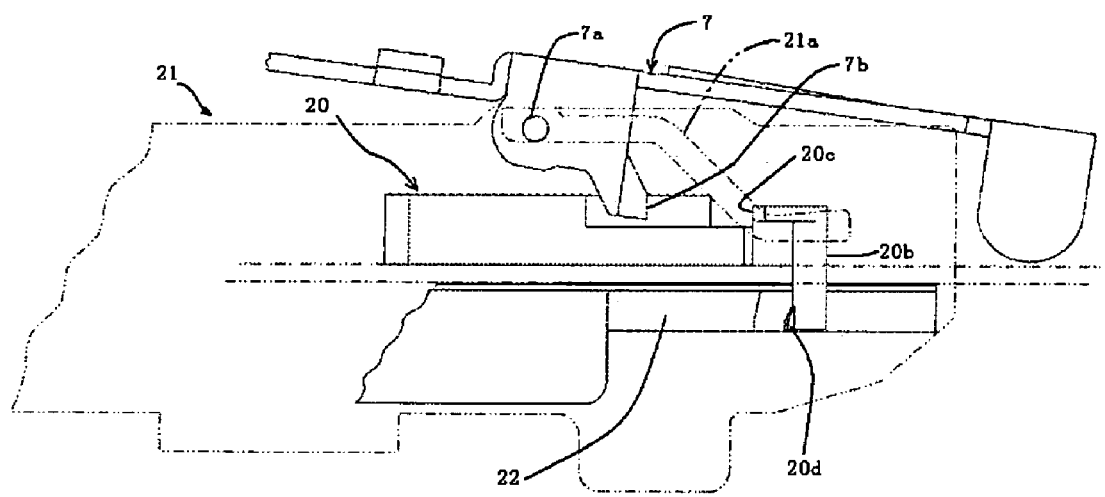

DISC CENTERING DEVICE

BACKGROUND OF THE INVENTION

1. Field of the Invention

This invention relates to disc players for selectively playing back one of small and large size discs and, more particularly, to disc centering devices for centering small size discs in the same disc players.

2. Description of the Prior Art

In a disc player for selectively playing back one of large and small size discs, in which either a small or a large size disc is centered with respect to a turntable by causing engagement of a clamper having a tapered surface in the center hole of the disc, the extent of disc insertion has to be changed according to the diameter or size of the inserted disc. The regulation of the extent of insertion of each disc is made by bringing the disc edge into contact with paired, i.e., left and right, small or large size disc stoppers. The large size disc stoppers are disposed rearwards relative to the small size disc stoppers in the disc inserting direction. Therefore, in the case of the large size disc insertion, the paired small size disc stoppers have to be caused to escape from the insertion path for the large size disc.

Japanese Patent Disclosure 2003-257109 discloses a disc centering device. In this device, paired left and right rockable disc sensor members have integral leading members, respectively, which also serve as small size disc stoppers. When the center of a small size disc inserted from a disc insertion slot slightly passes by the center of a turntable, the edge of the small size disc strikes the small size disc stoppers. As a clamper engages in the center hole of the small size disc, the small size disc is slightly pulled back by a tapered surface of the clamper to be separated from the small size disc stoppers, whereby the disc is centered relative to the turntable.

The disc is suitably inserted such that its center proceeds along a line passing through the axis of the turntable, which line is referred to as "disc insertion center line L". However, since the disc insertion slot is formed such that the large size disc can also be inserted through it, it is liable that the small size disc is deviated laterally as it is inserted. Excessive deviation of the disc in lateral direction may disable a disc centering operation by the tapered surface of the clamper.

This means that the leading members which also serve as small size disc stoppers, should be disposed at positions, at which the leading members fulfill both a function of limiting or regulating the extent of insertion of the small size disc and a function of guiding the small size disc, having been inserted in lateral deviation with respect to the disc insertion center line L, such that the center of the small size disc proceeds along the disc insertion center line L.

For limiting or regulating the extent of insertion of the small size disc, the leading members are desirably disposed at positions in the neighborhood of the disc insertion center line L. Doing so, however, poses a problem. That is, when the small size disc is inserted in a laterally deviated state, it may be disabled to guide the small size disc such that the center thereof proceeds along the disc insertion center line L.

In the meantime, for guiding the small size disc such that the center thereof proceeds along the disc insertion center line L, the leading members are desirably disposed such as to be laterally spaced apart from the disc insertion center line L as much as possible. However, commercially available discs slightly fluctuate in diameter, and in the case of insertion of a small size disc having a less diameter than the standard, the more the leading members are spaced apart from the disc insertion center line L, the more is the excessive insertion extent until the small size disc strikes the leading members. In this case, it is liable that the small size disc can no longer be pulled back by the tapered surface of the clamper.

As shown above, it is very difficult to set the positions of the leading members such as to fulfill both the function of limiting or regulating the extent of insertion of the small size disc and the function of correcting the deviation of the small size disc. Accordingly, it may be considered to set a long tapered surface of the clamper enough to be able to effect the centering even when the center of the small size disc is greatly deviated from the center of the turntable. By so doing, however, the extent of displacement of the clamper is increased to increase the size of the device.

The invention seeks to solve the above problems, and its object is to provide a disc centering device for both large and small size discs, which permits a centering operation of the small size disc relative to the turntable with the clamper without increasing the extent of displacement of the clamper.

SUMMARY OF THE INVEDNTION

In an disc player having a chassis, a disc insertion slot formed on the chassis for selectively inserting one of a large and a small size disc, a turntable disposed for rotating on the chassis, a disc insertion path along which the disc is to be passed toward the turntable, a clamper for holding the disc on the turntable, and a clamper support for supporting the clamper, a disc centering device according to the present invention comprises: paired left and right disc sensor members disposed on the chassis and each having one end and the other end; sensor portions each provided on said one end of each of the disc sensor members and leading portions provided on said other end of each of the disc sensor members; a movable member for being moved in the disc inserting direction to an extent corresponding to the diameter of the disc in an interlocked relation to the one of the disc sensor members; a trigger member supported for rocking on the movable member; a disc stopper for the large size disc provided on the trigger member; and a chassis portion formed on the chassis and capable of becoming in contact with the trigger member; whereby as the result of rocking of the trigger member pushed by the outer edge of the disc, said clamper is engaged into the center hole of the disc thereby to effect a disc centering operation; when inserting the small size disc from the disc insertion slot, the disc sensor members undergo synchronous rocking to each other as the sensor portions are pushed by the disc; as soon as the center of the small size disc passes between the two sensor portions, the lateral deviation of the small size disc is corrected by the leading portions of the disc sensor members; when inserting the large size disc from the disc insertion slot, the disc sensor members undergo synchronous rocking to each other to an increased extent compared to the case of inserting the small size disc as the sensor portions are pushed by the disc; with the rocking of the disc sensor members to the increased extent compared to the case of inserting the small size disc, the two leading portions are caused to escape from the disc insertion path along which the large size disc is to be passed, while the trigger member is brought into contact with the chassis portion for limiting the extent of insertion of the large size disc with the trigger member and the disc stopper for the large size disc; and at the time of the small size disc insertion, with the displacement of the movable member the trigger member is brought into contact with a clamper support supporting the clamper for limiting the extent of insertion of the small size disc with the trigger member and the leading portion of the other sensor member.

The paired disc sensor members are suitably provided on top of a support member. The support member defines below it a disc insertion path common to both the large and small size discs.

Also, it is suitable that the leading portions extend from the locality of the turntable rearwards in the disc inserting direction, and also that the centers of rocking of the disc sensor members are located between a line, which is normal to the axis of the turntable and also to the disc inserting direction, and a line, which is parallel to the afore-said line and contiguous to the edge of the turntable on the side of the disc insertion slot.

Furthermore, it is suitable that the extensions of the disc sensor members and guide portion formed on the support member constitute an escapement means, such that when the disc sensor members are caused to undergo rocking by the insertion of the large size disc, the extensions and the guide portion slide one another with the rocking of the disc sensor members to the increased extent to the case of inserting the small size disc, to cause the paired leading members or portions to escape upwards from the disc insertion path, along which the large size disc is to be passed.

Still further, by having one of the paired leading members or portions also serve as one of the paired small size disc stoppers, having the trigger member, which starts the clamper when pushed by the disc, also serve as the other small size disc stopper, and providing the other leading members or portions with an exclusive and sole function of correcting the deviation of the small size disc, it is possible to fulfill the small size disc stopper function and the deviation correction function without constituent member number increase and device size increase. Yet further, even with a small size disc having a diameter less than the standard of fluctuations, it is possible to regulate the extent of insertion of the small size disc at the position of the small size disc with the center thereof slightly passed by the center of the turntable. Thus, it is possible to obtain a centering operation with respect to the turntable with engagement of the clamper in the center hole of the small size disc without need of increasing the tapered surface of the clamper. That is, the distance between the turntable and the clamper need not be increased, and the size of the device may not be increased.

Further, with the disc sensor members mounted on top of the support member, which defines below it the disc insertion path common to both the large and small discs. Further, with the leading members or portions formed to extend from the locality of the turntable rearwards in the disc inserting direction and locating the centers of rocking of the disc sensor members between the line, which is normal to the axis of the turntable and also to the disc inserting direction, and the line, which is parallel to the afore-said line and contiguous to the edge of the turntable on the side of the disc insertion slot, it is possible to reduce the distance between each center of rocking and each leading member or portion. Thus, the extent of lateral displacement of the leading members can be held small, thus permitting size reduction of the device.

Further, with the escapement means constituted by the parts (i.e., extensions) of the disc sensor members and the parts (i.e., guide portions) of the support member, the constituent member number is not increased, which further promotes the simplification of the arrangement.

BRIEF DESCRIPTION OF THE DRAWINGS

The invention will become more apparent upon a reading of the following detailed description with reference to the accompanying drawings, in which:

FIG. 3 is a right side view showing part of the disc payer;

DESCRIPTION OF THE PREFERRED EMBODIMENTS

The best embodiment of carrying out the disc centering device according to the present invention will now be described with reference to the drawings.

Figure 1:
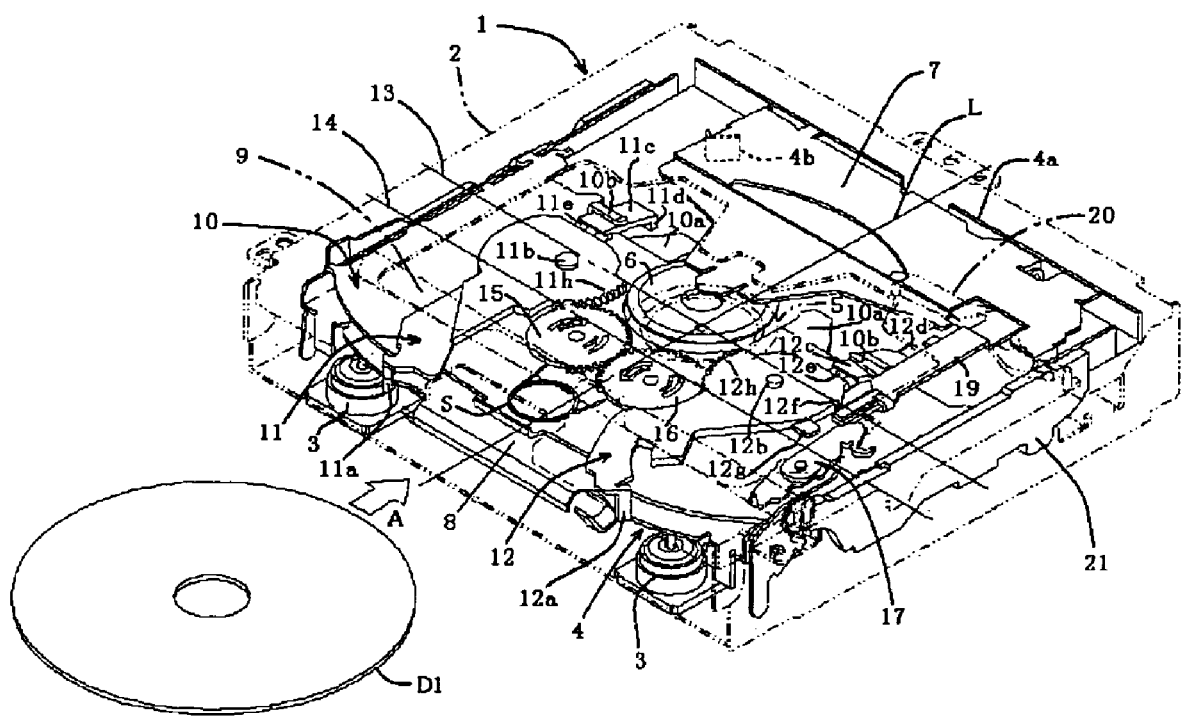
FIG. 1 is a perspective view showing an embodiment of the disc player having disc centering device according to the invention.

FIG. 1 is a perspective view showing the internal mechanism of a car-mounted disc player with the disc centering device mounted therein. The outer housing 2 of the device is shown by phantom lines. In the housing 2, a chassis 4 is mounted in a floating state via buffering members 3. Centrally of the chassis 4, a turntable 5 shown by phantom lines is mounted, and also a pick-up (not shown) is mounted such as to be movable between the neighborhood of the turntable 5 and a rear corner of the chassis 4.

Figure 7:
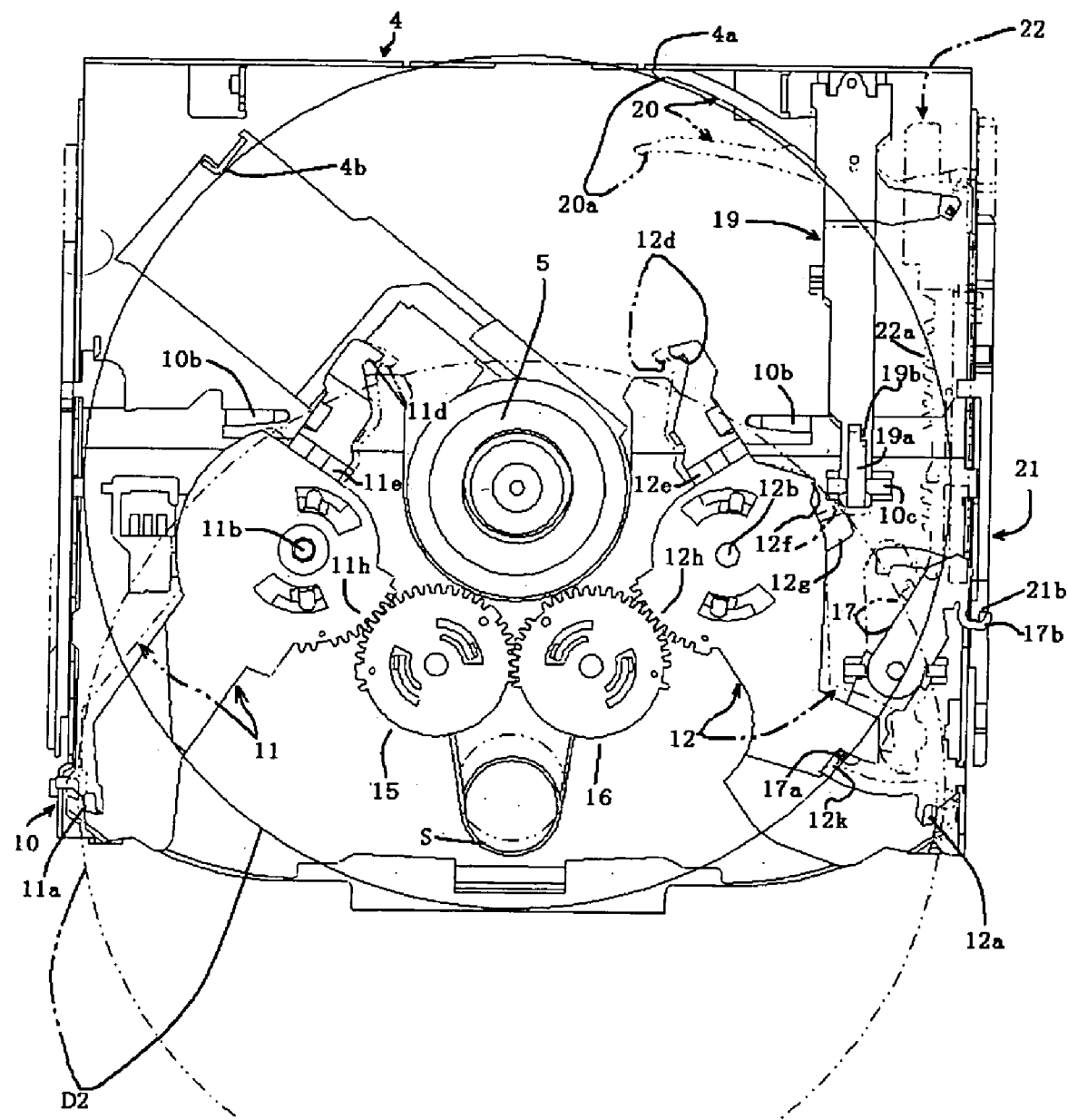
FIG. 7 is a plan view showing the disc player in the state at the time of large size disc insertion.

In this specification, by the term "longitudinal direction" of the housing 2 is meant a direction, in which a disc (i.e., small size disc D1 in FIG. 1 or large size disc D2 as shown in FIG. 7 is selectively inserted from a disc insertion slot 8 provided on the front side of the housing 2 in FIG. 1 rearwardly thereof. Also, by the term "lateral direction" is meant a direction (right and left directions) normal to the longitudinal direction. In FIG. 1 is shown disc insertion center line L which extends in the longitudinal direction through the axial line of the turntable 5. By the term "right side" and "left side" which are referred to in connection to various parts in the housing 2 are meant the right and left sides, respectively, of center line L shown in FIG. 2. The disposed state of the housing 2 is assumed to be the horizontal state, and the "upward" and "downward" directions are prescribed with reference to this state.

A clamper 6 is disposed above the turntable 5, and it co-operates with the turntable 5 to clamp a disc. The clamper 6 is supported for rotation by a clamper support 7.

The discs D1 and D2 are selectively inserted from the disc insertion slog 8 in the housing 2 in the direction of arrow A in FIG. 1 along the disc insertion center line L. A feed roller 9 (shown by phantom lines) is mounted on the chassis 4 between the disc insertion slot 8 and the turntable 5. A support member 10 is disposed above the chassis 4. Atop the support member 10, paired upwardly projecting and tilted guide portions 10a and also paired tongs 10b projecting like a hook, are disposed on the left and right sides, respectively.

Under the support member 10, a disc insertion path common to the large and small size discs is defined The feed roller 9 has a gear (not shown) provided at the right end, and the gear is rotated by a torque inputted from a motor (not shown) to feed the disc.

The chassis 4 has an upwardly bent rear end wall 4a which is formed at its rear end as a chassis portion. The chassis 4 also has an upwardly bent left side disc stopper 4b for the large size disc which is formed in the neighborhood of the left rear corner.

Figure 2:
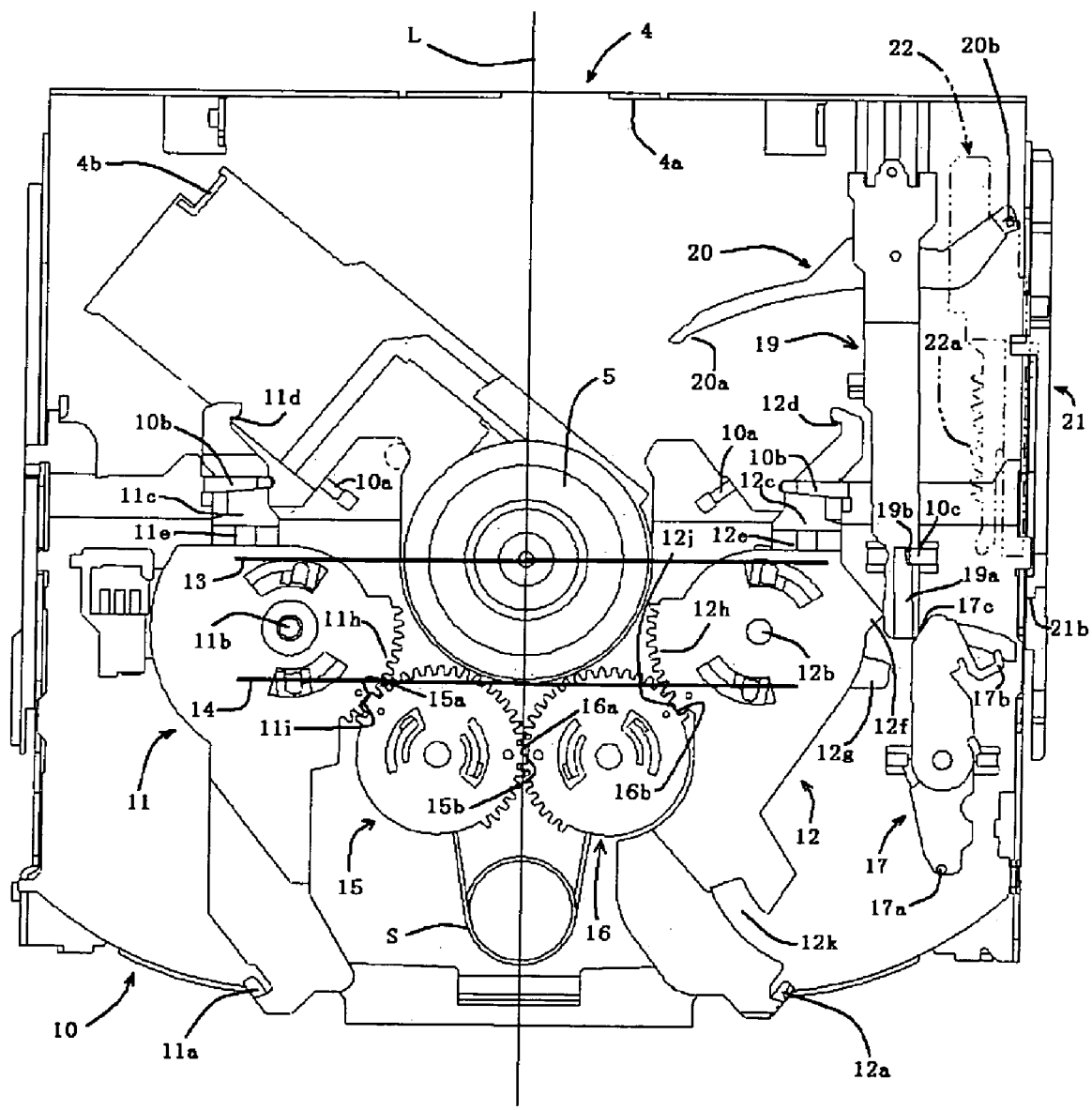
FIG. 2 is a plan view showing the disc player shown in FIG. 1.

A pair of, i.e., left and right disc sensor members 11 and 12 are mounted on the support member 10. The disc sensor members 11 and 12 each have an end extending up to the neighborhood of the disc insertion slot 8, and sensor portions 11a and 12a are formed at the end of the disc sensor members 11 and 12 respectively. As shown in FIGS. 1 and 2, the disc sensor members 11 and 12 have their rocking axes 11b and 12b located between a line 13, which is normal to the axis of the turntable 5 and the disc inserting direction and extends in the lateral direction of the housing 2, and a line 14, which is parallel to the line 14 and contiguous to the edge of the turntable 5 on the side of the disc insertion slot 8 and extends in the lateral direction of the housing 2.

The disc sensor members 11 and 12 each have the other end on which extensions 11c and 12c are formed respectively. These extensions 11c and 12c extend rearward from their locality of the turntable 5 along the longitudinal direction. At the respective free ends of the extensions 11c and 12c are provided leading members or portions 11d and 12d which project downwardly for guiding the small size disc D1 along the center line L. While the diameter of the small size disc D1 is 80 mm, in the state without any inserted disc the left and right leading members 11d and 12d are spaced apart leftward by about 36 mm and rightward by about 38 mm, respectively, from the disc insertion center line L in the lateral directions.

The right leading member 12d is spaced apart more than the left leading member 12d from the disc insertion center line L in the lateral directions for the following reasons. The right leading member 12d need only correct the deviation of the small size disc D1, and thus can be set at the best position for the deviation correction. The left leading member 11d, on the other hand, has to fulfill, in addition to the deviation correction function, a function as small size disc stopper, and hence it is located closer to the disc insertion center line L. For this reason, the right leading member 12d is spaced apart more than the left leading member 11d from the disc insertion center line L in the lateral direction to facilitate the disc deviation correction.

The extensions 11c and 12c of the disc sensor members 11 and 12 have readily vertically flexible thin stem parts 11e and 12e, and their upward flexing is prohibited by engagement of their intermediate parts with the bottom of the associated tongues 10b. When the left and right disc sensor members 11 and 12 are caused to undergo great rocking by the insertion of the large size disc D1 (see FIG. 3), the left and right extensions 11c and 12c detached from the associated tongues 10b to get into sliding contact with the associated guide portions 10a, thus causing the left and right leading members 11 and 12 to escape upwards from the insertion path for the large size disc D2 (see FIG. 7). The extensions 11c and 12c and the guide portions 10a constitute escapement means. The right disc sensor member 12 has a cam 12f projecting rightwards of its rocking axis 12b and also has a pushing piece 12g projecting at a position slightly beneath the cam 12f in the Figure.

Atop the support member 10, paired, i.e., left and right, interlock gears 15 and 16 meshing each other mounted for rotation between the two disc sensor members 11 and 12. The disc sensor members 11 and 12 have arc-like gear parts 11h and 12h, respectively, which are in mesh with the interlock gears 15 and 16, respectively and to be rocked coaxially with the rocking shafts 11b and 12b of the disc sensor members 11 and 12. The paired interlock gears 15 and 16 and the arc-like gear parts 11h and 12h co-operate with one another to cause synchronous rocking of the two disc sensor members 11 and 12 in lateral symmetry. A rocking bias spring S is provided between the interlock gears 15 and 16 to rock biasing the interlock gears and the disc sensor members 11 and 12 such as to bring the left and right sensor portions 11a and 12a closer to each other.

As shown in FIG. 2, the above meshing parts have raised and recessed parts, which mesh with one another in the state without any inserted disc as described below. The left disc sensor member 11 and two localities of the right interlock gear 16 have recessed parts 11i, 16a and 16b, respectively, which are formed by cutting off one teeth. The right disc sensor member 12 and two localities of the left interlock gear 15 have raised parts 12j, 15a and 15b, respectively, which are in mesh with their associated recessed parts. The recessed parts 11i, 16a and 16b and the raised parts 12j, 15a and 15b serve as criteria of positioning when mounting the pair of disc sensor members 11 and 12 and the pair of interlock gears 15 and 16 on the support member 10, facilitate the mounting of these parts. The recessed and raised meshed parts provide for mechanical strength improvement owing to the meshing of the mate parts. This means that in the initial position, owing to the meshing of the associated ones of the recessed parts 11i, 16a and 16b and recessed parts 12j, 15a and 15b, mechanical strength enhancement is obtained in the locality requiring the highest mechanical strength when their disc sensor members 11 and 12 start to be rocked by the disc insertion. It is thus possible to enhance the mechanical strength of the parts themselves. Thus, there is no need of using any expensive material or increase the thickness of the teeth for enhancing the mechanical strength.

Atop the support member 10, a locking lever 17 has its intermediate part supported for rocking at a position on the right side of the right disc sensor member 12. The locking lever 17 has an upwardly projecting locking pin 17a provided at one end of it such as to be engaged in a U-shaped groove 12k of the right disc sensor member 12. The locking lever 17 also has a sliding contact pin (not shown), which is provided at the other end and can be in sliding contact with the edge of inserted large size disc D2 (see FIG. 7). The locking lever 17 further has a hook 17b formed in its other end part.

Between the right disc sensor member 12 and the locking lever 17, an elongate movable member 19 is disposed with its longitudinal direction set in the disc inserting direction. The movable member 19 is movable in the longitudinal directions, and its one end part is also slightly movable in the lateral directions. The movable member 19 has an increased thickness part 19a provided on top of its one end part, and the increased thickness part 19a has a notched part 19b. The notched part 19b is adapted to receive a bent part 10c formed by cutting and raising part of the chassis 10. The increased thickness part 19a is located above the pushing part 12g of the right disc sensor member 12 in the Figure and on the right side of the cam 12f.

The locking lever 17 is biased for rocking by a very weak spring (not shown) in the counterclockwise direction such as to detach the locking pin 17*a* from the U-shaped groove 12*k* of the right disc sensor member 12. The increased thickness part 19*a* has an inclined part 17*c* provided at the other end and pushing the increased thickness part 19*a*. The increased thickness part 19*a* thus has its left side pushed against the can 12*f*, so that it is not displaced leftwards any more. Thus, the notched part 19*b* of the movable member 19 is not detached from the bent part 10*c* at all. On the movable member 19, a laterally elongate trigger member 20 has its intermediate part mounted for rocking at a position on the rear side of the right leading member 12*d*.

The trigger member 20 is biased by a weak spring (not shown) for rocking in the clockwise direction. The trigger member 20 has a disc contact part 20*a* provided at the left end. The disc contact part 20*a* is spaced apart about 15 to 20 mm rightwards from the disc insertion center line L so as to be located on the disc insertion path common to the large and small size discs. A right end part 20*b* of the trigger member 20 penetrates the chassis 4, with its lower end located under the bottom of the chassis 4 (see FIG. 3). As soon as the trigger member 20 detects the disc insertion and causes start falling operation of the clamper 6 (see FIG. 1). The disc contact part 20*a* of the trigger member 20 also serves as a right side disc stopper for the large size disc and also a right side disc stopper for the small size disc.

On the right side of the chassis 4, a slide member 21 is mounted for displacement in the disc inserting direction, and it has a locking part 21*b* provided on top of its one end part. On the bottom of the chassis 4, a slider 22 having a rack gear 22*a* shown by phantom lines is disposed in parallel with the slide member 21. The slider 22 is biased by a spring (not shown) upwards in the Figure with respect to the slide member 21.

FIG. 3 is a right side view showing a part of FIG. 2. The clamper support 7 has a cam pin 7*a* and a contacted part 7*b* both provided substantially centrally of it. The right end 20*b* of the trigger member 20 has a top contact part 20*c* for being in contact with the contacted part 7*b* of the clamper support 7, and it also has a bottom pushing part 20*d* for pushing the slider 22. The back surface of the slide member 21 has an inclined cam groove 21*a*, in which the cam pin 7*b* of the clamper support 7 is engaged. As shown in FIG. 1 or 2, the disc centering device for the disc player 1 comprises the pair of, i.e., left and right, disc sensor members 11 and 12, the trigger member 20, the pair of, i.e., left and right, leading member 11*d* and 12*d*, the escapement means constituted by the pair of, i.e., left and right, guide portions 10*a* and extensions 11*c* and 12*c*, the movable member 19, the clamper 6 and the clapper support 7.

Figure 4:
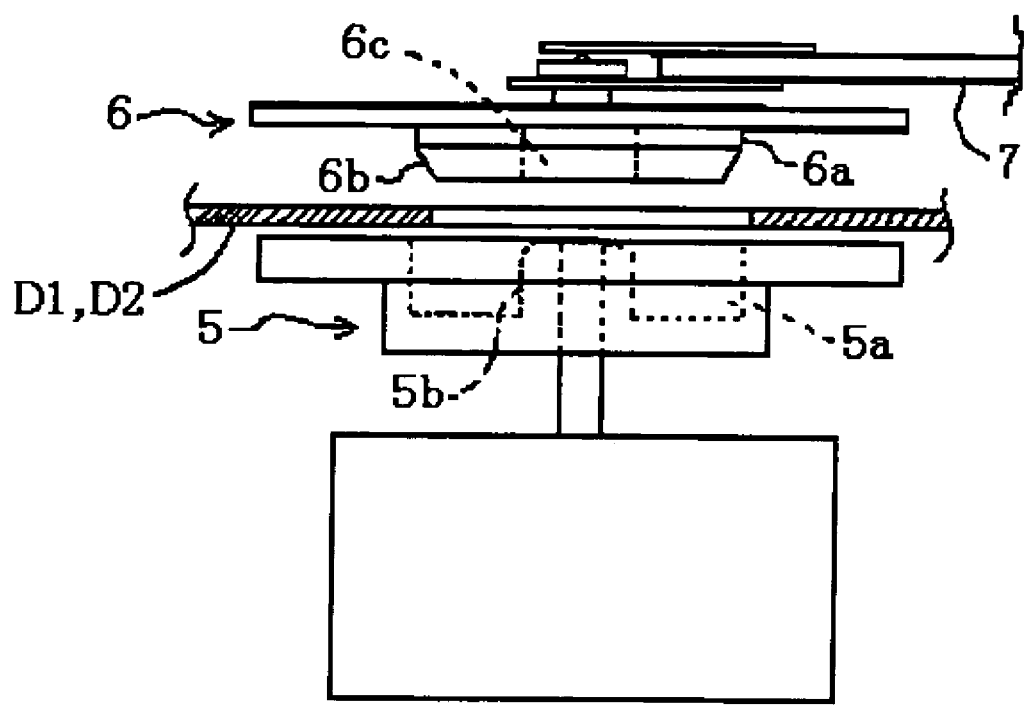
FIG. 4 is a fragmentary enlarged-scale side view showing the relation between a turntable and a clamper.

As shown in FIG. 4, the clamper 6 has a cylindrical projection 6*a* to be engaged in the center hole of the disc and a taper surface part 6*b* integral with the projecting end of the cylindrical projection. The cylindrical projection 6*a* has an engagement recess 6*c*.

The turntable 5 has an accommodation recess 5*a* for accommodating the cylindrical projection 5*a* and also has a cylindrical part 5*b* to be engaged in the engagement recess 6*c*.

Now, the operation of the disc centering device will be described.

Figure 5:
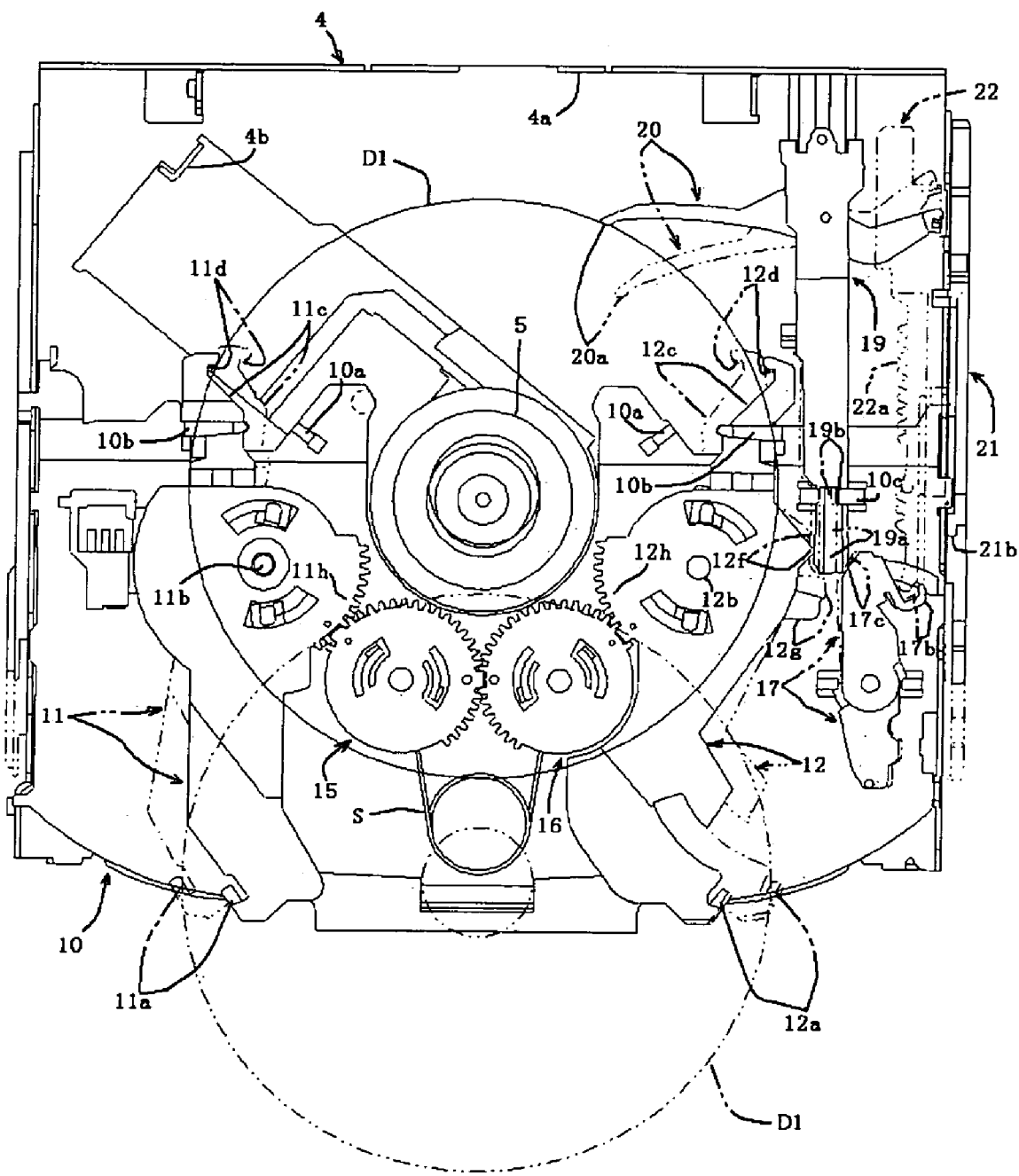
FIG. 5 is a plan view showing the disc player in the state at the time of the small size disc insertion.

FIG. 5 shows the way of feeding of a small size disc D1 inserted from the disc insertion slot 8 (see FIG. 1). When the small size disc D1 is inserted through the disc insertion slot (see FIG. 1), the two sensor portions 11*a* and 12*a* are pushed apart by the edge of the small size disc D1 as shown by phantom lines, causing slight rocking of the disc sensor members 11 and 12. At the time of insertion of the small size disc D1, the disc sensor members 11 and 12 are rocked only slightly, so that the intermediate parts of the extensions 11*c* ad 12*c* are not detached from the bottom of the tongues 10*b* as shown by phantom lines.

Also, with the rocking of the right disc sensor member 12, the cam 12*f* is displaced to the left. Thus, the increased thickness part 19*a* of the movable member 19 is caused by the pushing force of the inclined part 17*c* of the locking lever 17 to follow the cam 12*f* as shown by phantom lines. As a result, the notched part 19*b* is detached from the bent part 10*c* of the support member 10.

However, at the time of insertion of the small size disc D1, the extent of rocking of the disc sensor members 11 and 12 is not enough to have the pushing part 12*g* of the right disc sensor member 12 push in the increased thickness part 19*a*. When the center of the small size disc D1 clears the gap between the two sensor portions 11*a* and 12*a*, the two sensor portions 11*a* and 12*a* are restored by the biasing of the bias spring S toward each other along the edge of the small size disc D1. Thus, the cam 12*f* is also restored to the right, thus causing the movable member 19 to be pushed back to the initial position against the biasing force of the locking lever 17. In this way, the notched part 19*b* of the movable member 19 is restored to the position of engagement with the bent part 10*c* of the support member 10 as shown by solid lines.

With further feeding of the small size disc D1, the edge of the small size disc D1 pushes the disc contact part 20*a* of the trigger member 20 to cause rocking thereof as shown by solid lines in FIG. 5. The pushing part 20*a* of the trigger member 20 (see FIG. 3) thus pushes the slider 22 to case downward displacement thereof in the Figure.

With the displacement of the slider 22, the rack gear 22*a* thereof is brought into mesh with gears of a drive mechanism (not shown). As a result, the slider 22 is driven by the motor to be displaced downward in the Figure together with the slide member 21. Thus, the cam pin 7*a* of the clamper support 7 shown in FIG. 3 is displaced in the tilted cam groove 21*a* of the slide member 21, thus causing the clamper 6 to be displaced downward.

Meanwhile, the insertion of the small size disc D1 causes rocking of the trigger member 20 to bring the contact part 20*c* into contact with the contacted part 7*b* of the clamper support 7, whereby further rocking of the trigger member 20 is prohibited. As shown in FIG. 5, the edge of the small size disc D1 is also brought into contact with the left leading member 11*d*, whereby further feeding of the small size disc D1 is prohibited by the disc contact part 20*a*, which also serves as right small size disc stopper, and the left leading member 11*d*, which also serves left small size disc stopper.

With the downward displacement of the clamper 6 as shown in FIG. 4, the tapered surface 6*b* of the clamper 6 is brought into contact with the edge of the center hole of the disc. Thus, the small size disc D1 is slightly pulled back, and the clamper 6 is further displaced downwards, whereby the small size disc D1 is clamped between the turntable 5 and the clamper 6.

Figure 6:
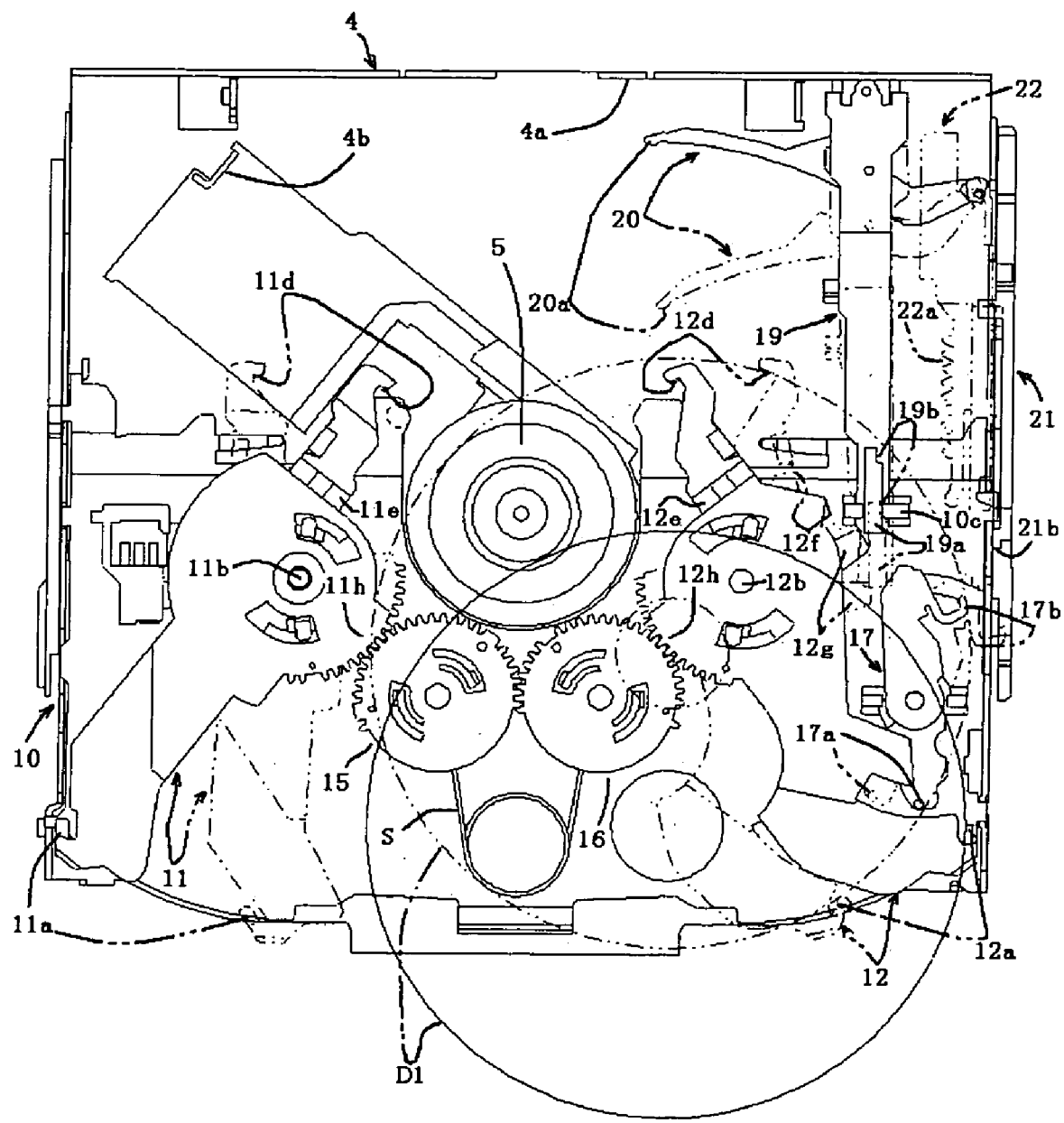
FIG. 6 is a plan view showing the disc player in the state at the time of insertion of a small size disc in a rightwardly tilted fashion.

When the small size disc D1 is extremely deviated to the left or right as it is inserted (rightward deviation in the insertion being shown in FIG. 6), the disc sensor members 11 and 12 are caused to undergo great rocking in an interlocked fashion as shown by solid lines. Thus, the movable member 19 following the cam 12*f* of the right disc sensor member 11, is displaced to the left to cause the notched part 19*b* of the movable member 19 to be detached from the bent part 10*c* of the support member 10. Then the pushing part 12g of the right disc sensor member 12 pushes the increased thickness part 19a, which is thus displaced in the disc inserting direction.

However, when the center of the small size D1 clears the gap between the sensor portions 11a and 12a of the two disc sensor members 11 and 12, they are moved back toward each other along the edge of the small size disc D1 as shown by phantom lines. Thus, the movable member 19 is also restored, and the notched part 19b is thus restored to the position of engagement with the support member 10.

The deviation of the small size disc D1 is thus corrected by the left or right leading member 11d or 12d.

FIG. 7 shows the way of feeding of large size disc D2 inserted from the disc insertion slot 8 (see FIG. 1). As shown in FIG. 7, when the large size disc D2 is inserted from the disc insertion slot 8 (see FIG. 1), the two sensor portions 11a and 12a are pushed apart by the edge of the large size disc D2 to cause great rocking of the disc sensor members 11 and 12.

Like the case of insertion of the small size disc D1 (see FIGS. 1, 5 and 6), as shown by phantom lines in FIG. 7, the rocking of the right disc sensor member 12 causes displacement of the cam 12f, thus causing the notched part 19b of the movable member 19 to be detached from the bent part 10c of the support member 10. The movable member 19 is thus displaced in the disc inserting direction with its increased thickness part 19a pushed by the pushing part 12a of the disc sensor member 12.

Figure 8:
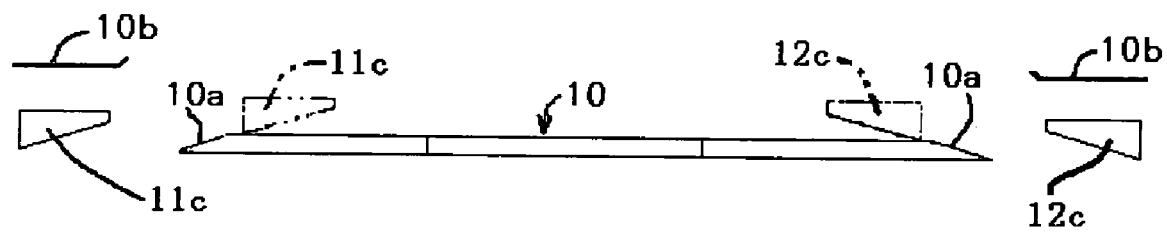
FIG. 8 is a fragmentary enlarged-scale rear view showing the relation between extensions and guide portions.

When the disc sensor members 11 and 12 are rocked to a greater extent with further feeding of the large size disc D2, as shown in FIG. 8, the extensions 11c and 12c are detached from the tongues 10b to be in sliding contact with the guide portions 10a. As a result, as shown in FIG. 7, the escapement means constituted by the extensions 11c and 12c and the guide portions 10a causes the leading members 11d and 12d to be displaced upward and escaped from the insertion path of the large size disc D2. The large size disc D2 is thus fed below the leading members 11d and 12d. At this time, a slide pin (not shown) of the locking lever 17 is pushed by the large size disc, causing clockwise rocking of the locking lever 17 as shown by solid lines. The pin 17a is thus brought into engagement with the U-shaped groove 12k, thus causing retention of the disc sensor members 11 and 12 in the rocked position.

As the large size disc D2 is further fed with contact of the edge of the large size disc D2 with the contact part 20a of the trigger member 20, the trigger member 20 is caused to undergo rocking to push part of the slider 22 with its pushing part 20d (see FIG. 3). As a result, the slider 22 is displaced downward in FIG. 7. Also, the disc contact part 20a is brought into contact with the rear wall or chassis portion 4a, and the edge of the large size disc D2 is brought into contact with the left large size disc stopper 4b. Thus, further feeding of the large size disc D2 is prohibited by the disc contact part 20a which also serves as the right large size disc stopper and the left large size disc stopper 4b.

As described above, the right disc sensor member 12, the locking lever 17, the movable member 19 and the trigger member 20 are related to one another as follows. When the extent of rocking of the disc sensor member 12 is small at the time of insertion of the small size disc D1 (see FIGS. 1, 5 and 6), the movable member 19 is not displaced in the longitudinal direction. In this case, the contact part 20a of the trigger member 20 serves as small size disc stopper. When the extent of feeding of the disc sensor member 12 is large at the time of insertion of the large size disc D2, on the other hand, the movable member 19 is displaced in the longitudinal direction, and the disc contact part 20a of the trigger member 20 functions as large size disc stopper. It will be appreciated that in dependence upon the extent of rocking of the disc sensor member 12, the movable member 19 causes the trigger member 20 to selectively serve one of two different roles.

With the displacement of the slide 22, the rack gear 22a thereof is brought into mesh with gears of a drive mechanism gear (not shown). As a result, by receiving torque of motor (not shown), the slide member 21 is displaced together with the slider 22 downwards in the Figure. Thus, as shown in FIG. 3, the cam pin 7a of the clamper support 7 in engagement in the tilted cam groove 21a of the slide member 21 is displaced along the tilted cam groove 21a, to cause lowering of the clamper 6.

Like the case of insertion of the small size disc D1 as described before, the tapered surface 6b of the clamper 6 slightly pulls back the large size disc D2 to effect centering, and the large size disc D2 is clamped between the turntable 5 and the clamper 6.

As shown in FIGS. 1 to 8, the left leading member 11d serves as a left disc stopper for the small size disc, and the contact part 20a of the trigger member 20, which starts the clamper when pushed by the disc, also serves as a right disc stopper for the small size disc, and the right leading member 12d is provided with the sole function of correcting the deviation of the small size disc. Thus, it is possible to make both the small size disc stopper function and the deviation correction function to be reliable without increasing the number of constituent members nor increasing the size of the device.

Also, by mounting the disc sensor members 11 and 12 on the top of the support member 10, below which the disc insertion path common to the large and small size discs D1 and D1, it is possible to simplify the disc centering device. Furthermore, by having the leading members 11d and 12d extend rearwardly from the locality of the turntable 5 in the disc inserting direction and having the center of rocking of each of the disc sensor members 11 and 12 located between a line 13, which is normal to the axis of the turntable 5 and also to the disc inserting direction, and a line 14, which is parallel to the line 13 and to be in contact with the edge of the turntable 5 on the side of the disc insertion slot, the center of rocking of each of the disc sensor members 11 and 12 is located more rearwardly than in the case of the prior art disc centering device. Thus, the length from each rocking center to each of the leading members 11d and 12d is reduced, and it is possible to reduce the extent of displacement of the leading members 11d and 12d and reduce the size of the disc centering device.

Still further, by constituting the escapement means with the extensions 11d and 12d of the disc sensor members 11 and 12 and the guide portion 10a of the support member 10, the number of constituent members is not increased, thus permitting further simplification of the arrangement.

What is claimed is:

1. In an disc player having a chassis (4), a disc insertion slot (8) formed on the chassis for selectively inserting one of a large and a small size disc (D1, D2), a turntable (5) disposed for rotating on the chassis, a disc insertion path along which the disc is to be passed toward the turntable, a clamper (6) for holding the disc on the turntable, and a clamper support (7) for supporting the clamper, a disc centering device comprising:

paired left and right disc sensor members (11, 12) disposed on the chassis and each having one end and the other end;

sensor portions (11a, 12a) each provided on said one end of each of the disc sensor members and leading portions (11d, 12d) provided on said other end of each of the disc sensor members;

a movable member (19) for being moved in the disc inserting direction to an extent corresponding to the diameter of the disc in an interlocked relation to the one (12) of the disc sensor members;

a trigger member (20) supported for rocking on the movable member;

a disc stopper for the large size disc (D2) provided on the trigger member; and a chassis portion (4a) formed on the chassis (4) and capable of becoming in contact with the trigger member;

whereby:

as the result of rocking of the trigger member pushed by the outer edge of the disc, said clamper is engaged into the center hole of the disc thereby to effect a disc centering operation;

when inserting the small size disc (D1) from the disc insertion slot (8), the disc sensor members undergo synchronous rocking to each other as the sensor portions are pushed by the disc;

as soon as the center of the small size disc passes between the two sensor portions, the lateral deviation of the small size disc is corrected by the leading portions of the disc sensor members;

when inserting the large size disc (D2) from the disc insertion slot, the disc sensor members undergo synchronous rocking to each other to an increased extent compared to the case of inserting the small size disc as the sensor portions are pushed by the disc;

with the rocking of the disc sensor members to the increased extent compared to the case of inserting the small size disc, the two leading portions are caused to escape from the disc insertion path along which the large size disc is to be passed, while the trigger member is brought into contact with the chassis portion (4a) for limiting the extent of insertion of the large size disc with the trigger member and the disc stopper (4b) for the large size disc; and at the time of the small size disc insertion, with the displacement of the movable member the trigger member is brought into contact with a clamper support (7) supporting the clamper for limiting the extent of insertion of the small size disc with the trigger member and the leading portion (11d) of the other sensor member (11).

2. The disc centering device according to claim 1, further comprising a support member (10) having an upper side surface and a lower side surface which defines said disc insertion path common to the large and small discs, wherein said disc sensor members are mounted on the upper side of the support member.

3. The disc centering device according to claim 1, wherein said leading portions are positioned to extend rearwards in the disc inserting direction from the locality of the turntable; and each of said disc sensor members has a rocking center (11b, 12b) which is located between a first line (13), which is normal to the axis of the turntable and also to the disc inserting direction, and a second line (14), which is parallel to the first line and contiguous to the edge of the turntable on the side of the disc insertion slot.

4. The disc centering device according to claim 2, wherein said leading portions are positioned to extend rearwards in the disc inserting direction from the locality of the turntable; and each of said disc sensor members has a rocking center (11b, 12b) which is located between a first line (13), which is normal to the axis of the turntable and also to the disc inserting direction, and a second line (14), which is parallel to the first line and contiguous to the edge of the turntable on the side of the disc insertion slot.

5. The disc centering device according to claim 1, wherein said disc sensor members have extensions (11c, 12c) respectively; said support member has a guide portion (10a); and when the disc sensor members are caused to undergo rocking by the insertion of the large size disc, said extensions and said guide portion slide along one another with the rocking of the disc sensor members to the increased extent to the case of inserting the small size disc, to cause the paired leading portions to escape from said disc insertion path along which the large disc is to be passed.

6. The disc centering device according to claim 2, wherein said disc sensor members have extensions (11c, 12c) respectively; said support member has a guide portion (10a); and when the disc sensor members are caused to undergo rocking by the insertion of the large size disc, said extensions and said guide portion slide along one another with the rocking of the disc sensor members to the increased extent to the case of inserting the small size disc, to cause the paired leading portions to escape from said disc insertion path along which the large disc is to be passed.

7. The disc centering device according to claim 3, wherein said disc sensor members have extensions (11c, 12c) respectively; said support member has a guide portion (10a); and when the disc sensor members are caused to undergo rocking by the insertion of the large size disc, said extensions and said guide portion slide along one another with the rocking of the disc sensor members to the increased extent to the case of inserting the small size disc, to cause the paired leading portions to escape from said disc insertion path along which the large disc is to be passed.

* * * * *